(12) United States Patent
Linnell (10) Patent No.: US 7,809,884 B1
(45) Date of Patent: Oct. 5, 2010

(54) DATA STORAGE SYSTEM POWER MANAGEMENT

(75) Inventor: Thomas E. Linnell, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 874 days.

(21) Appl. No.: 11/540,058

(22) Filed: Sep. 29, 2006

(51) Int. Cl.
*G06F 13/00* (2006.01)
(52) U.S. Cl. ........................ 711/114; 713/320
(58) Field of Classification Search ............ 711/114; 713/320
See application file for complete search history.

(56) References Cited

U.S. PATENT DOCUMENTS

| | | | |
|---|---|---|---|
| 6,925,529 B2 * | 8/2005 | Bohrer et al. ............... | 711/114 |
| 6,948,042 B2 | 9/2005 | Nagase et al. | |
| 7,032,119 B2 * | 4/2006 | Fung ......................... | 713/320 |
| 7,035,883 B2 * | 4/2006 | Kezuka et al. ............... | 1/1 |
| 7,146,522 B1 | 12/2006 | Rowe et al. | |
| 7,174,439 B2 | 2/2007 | Nagase et al. | |
| 7,194,592 B2 * | 3/2007 | Sato ........................... | 711/165 |
| 7,216,244 B2 * | 5/2007 | Amano ....................... | 713/324 |
| 2004/0111558 A1 * | 6/2004 | Kistler et al. ............... | 711/114 |

* cited by examiner

*Primary Examiner*—Hetul Patel
(74) *Attorney, Agent, or Firm*—BainwoodHuang (57) ABSTRACT

A technique provides access to data in a data storage system. The technique involves providing a disk mirroring assembly including a primary mirror and a secondary mirror. The primary mirror has a set of high speed disk drives. Each high speed disk drive is configured to provide data access while rotating platters at a predefined high performance speed. The secondary mirror has a set of moderate speed disk drives. Each moderate speed disk drive is configured to provide data access while rotating platters at a predefined moderate speed which is less than the predefined high performance speed. The technique further involves operating the disk mirroring assembly in a particular power management state, and performing data access operations on the disk mirroring assembly while the disk mirroring assembly operates in the particular power management state.

22 Claims, 8 Drawing Sheets

DATA STORAGE SYSTEM POWER MANAGEMENT

BACKGROUND

A conventional data storage system typically includes front-end circuitry (e.g., a front-end server, a storage processor, a set of directors, etc.), a cache and enterprise-style disk drives (i.e., hard disk drives having platters designed to continuously rotate at extremely high speed for minimal latency). The front-end circuitry performs a variety of data storage operations (e.g., load and store operations) on behalf of one or more external clients by carrying out data access commands on the disk drives. During this operation, the cache temporarily buffers the exchanged data. In particular, a read portion of the cache temporarily holds data retrieved from the disk drives in the event that such data is needed again. Additionally, a write portion of the cache temporarily holds data written to the disk drives to enable the data storage system to acknowledge completion of write requests as soon as the write requests hit the cache under a write-back caching write policy.

Such a conventional data storage system is typically designed to operate at a peak state of readiness all the time. For example, the enterprise-style disk drives of the data storage system are directed to continuously spin their platters. In this peak state of readiness, the data storage system is always equipped to service requests immediately after receipt in the quickest manner possible.

Furthermore, such a conventional data storage system typically includes redundant disk drives (all of which have the same full operating speed) for fault tolerance. For example, the data storage system may implement RAID1 which involves simultaneously writing data to multiple disk drives. Accordingly, if one disk drive fails (e.g., becomes unavailable due to a head crash), the other disk drive remains available to provide the data.

SUMMARY

Unfortunately, there are deficiencies with the above-described conventional data storage system. For example, the conventional data storage system continuously rotates the platters of the enterprise-style disk drives at an extremely high speed, and thus always consumes maximum power, regardless of the workload placed on the data storage system. Although operation of the data storage system at maximum power can be easily justified when the data storage system has a full workload, the data storage system becomes over-provisioned once the workload diminishes. In particular, the workload may change dramatically over the course of time (e.g., a day, a week, a month, etc.). At times, the workload may become so light that continuous rotation of the platters is unjustified and extremely wasteful of power.

There are some conventional approaches to power management of a conventional data storage system which involves cutting power to all of the disk drives when there are no I/O requests. Unfortunately, in the context of a data storage system having enterprise-style disk drives, it would take a significant amount of time to properly spin-up the enterprise-style disk drives (e.g., a minute and a half to two minutes), and data access of the enterprise-style disk drives typically does not occur until the enterprise-style disk drives reach their full operating speed. In the meantime, any attempts to access data on the enterprise-style disk drives would receive significant delays thus making this approach unpractical.

In contrast to the above-described conventional data storage system which continuously rotates platters to remain at a peak state of readiness, an improved technique for providing access to data involves the use of a combination of high speed disk drives (e.g., enterprise-style disk drives) and moderate speed disk drives (e.g., desktop-style disk drives). The high speed disk drives mirror data on the moderate speed disk drives (e.g., using RAID1), and respond to high-priority read requests. The moderate speed disk drives respond to low-priority read requests. Both sets of disk drives respond to write requests. Relative to a conventional data storage system which uses only enterprise-style disk drives, such an improved technique offers lower power consumption since the moderate speed disk drives consume less power. Furthermore, the moderate speed disk drives generally take considerably less time to spin up and down than enterprise-style disk drives and thus enable the data storage system to de-activate the moderate speed disk drives in response to requests when the workload diminishes while still offering reasonable response times (i.e., parts of the array can be shut down with no loss of access to data and with no significant delays). As a result, the improved technique provides the data storage system with the ability to dynamically alter the amount of power required to operate and thus generates significant operational cost savings over the course of its service life.

One embodiment is directed to a method of providing access to data in a data storage system. The method involves providing a disk mirroring assembly including a primary mirror and a secondary mirror. The primary mirror has a set of high speed disk drives (e.g., enterprise-style disk drives). Each high speed disk drive is configured to provide data access while rotating platters at a predefined high performance speed. The secondary mirror has a set of moderate speed disk drives (e.g., desktop-style disk drives). Each moderate speed disk drive is configured to provide data access while rotating platters at a predefined moderate speed which is less than the predefined high performance speed. The method further involves operating the disk mirroring assembly in a particular power management state, and performing data access operations on the disk mirroring assembly while the disk mirroring assembly operates in the particular power management state.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An improved technique for providing access to data involves the use of a combination of high speed disk drives (e.g., enterprise-style disk drives) and moderate speed disk drives (e.g., desktop-style disk drives). The high speed disk drives mirror data on the moderate speed disk drives (e.g., using RAID1), and respond to high-priority read requests. The moderate speed disk drives respond to low-priority read requests. Both sets of disk drives respond to write requests. Relative to a conventional data storage system which uses only enterprise-style disk drives, such an improved technique offers lower power consumption since the moderate speed disk drives consume less power. Furthermore, the moderate speed disk drives generally take considerably less time to spin up and down than enterprise-style disk drives and thus enable the data storage system to activate the moderate speed disk drives in response to requests when the workload diminishes while still offering reasonable response times (i.e., parts of the array can be shut down with no loss of access to data and with no significant delays). As a result, the improved technique provides the data storage system with the ability to dynamically alter the amount of power required to operate and thus generates significant operational cost savings over the course of its service life.

Figure 1:
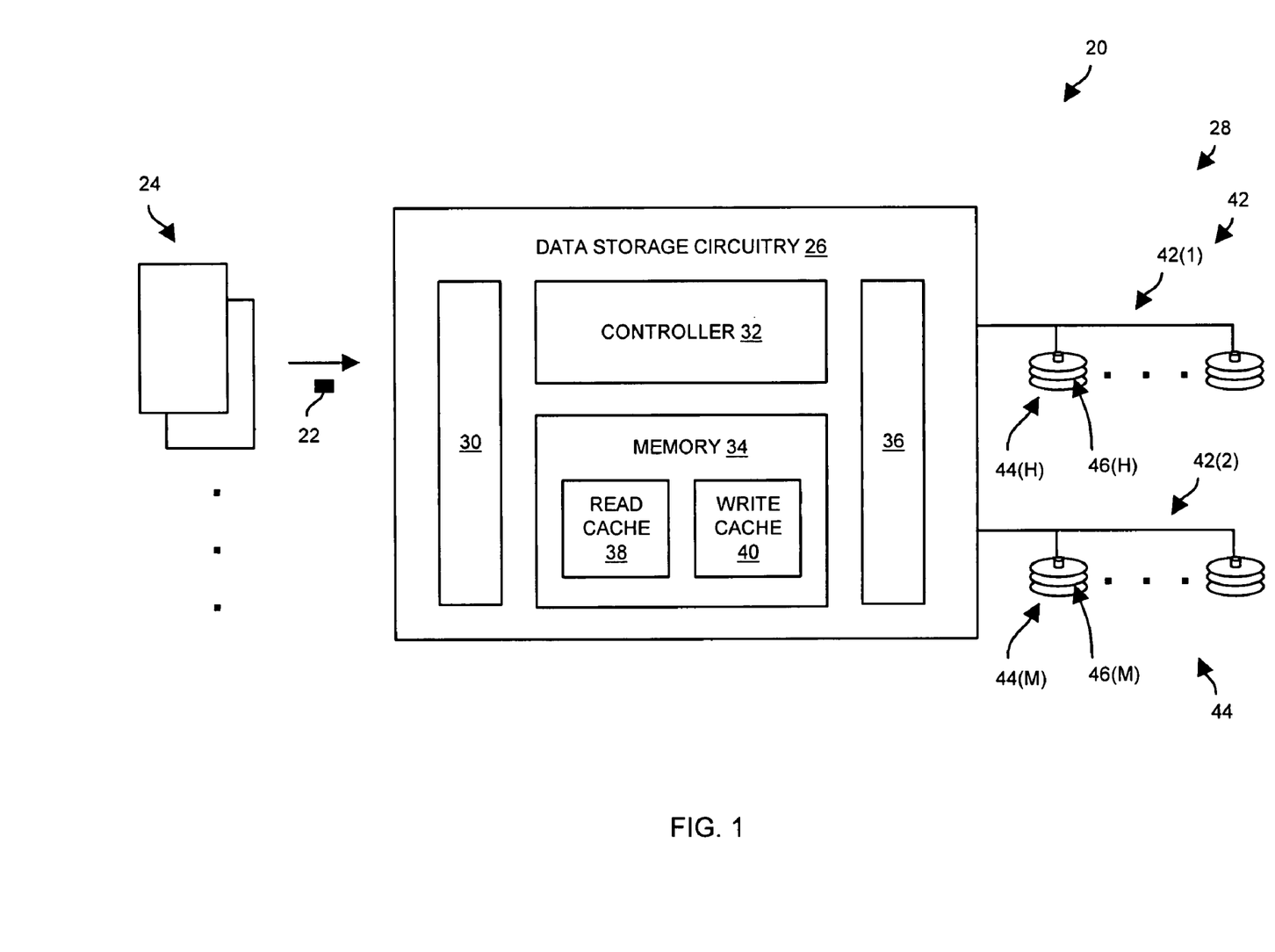
FIG. 1 is a block diagram of a data storage system which uses a combination of a set of high speed disk drives and a set of moderate speed disk drives.

FIG. 1 is a block diagram of a data storage system 20 configured to perform data storage operations 22 on behalf of a set of external client devices 24 (i.e., one or more client devices 24) while operating disk drives in an improved power management manner. The data storage system 20 includes data storage circuitry 26 and a disk mirroring assembly 28. The data storage circuitry 26 includes a host interface 30 (e.g., I/O cards), a controller 32, memory 34 and a disk drive interface 36 (e.g., disk adapters). The memory 34 includes a read cache 38 and a write cache 40. The memory 34 may include other dedicated sections as well.

The disk mirroring assembly 28 includes a primary mirror 42(1) having a set of high speed disk drives 44(H) (i.e., one or more high speed disk drives 44(H)). Each high speed disk drive 44(H) is configured to provide data access while rotating platters 46(H) at a predefined high performance speed (e.g., 10,000 RPM). Such disk drives 44(H) are preferably optimized for high-performance access times and high duty cycle environments.

The disk mirroring assembly 28 further includes a secondary mirror 42(2) having a set of moderate speed disk drives 44(M). Each moderate speed disk drive 44(M) is configured to provide data access while rotating platters 46(M) at a predefined moderate performance speed which is less than the predefined high performance speed (e.g., 7,200 RPM). Such desktop-style disk drives 44(M) are preferably designed for lighter duty, high start/stop cycles and have power management features built-in.

In some arrangements, the primary mirror 42(1) and the secondary mirror 42(2) (collectively, mirrors 42) carry out RAID1. Other mirroring and RAID variations are suitable for use as well.

During operation, the caches 38, 40 temporarily buffer the data exchanged between the external client devices 24 and the disk mirroring assembly 28. In particular, the read cache 38 temporarily holds data retrieved from the disk mirroring assembly 28 in the event that such data is needed again. Over time, old data in the read cache 38 may be overwritten with newer data read from the disk mirroring assembly 28.

Additionally, the write cache 40 temporarily holds data written to the disk mirroring assembly 28 to enable the data storage system 20 to acknowledge completion of write requests as soon as the write requests hit the write cache 40 under a write-back caching write policy. The controller 32 empties write requests from the write cache 40 to the disk mirroring assembly 28 when the write cache 40 becomes filled to a certain level (i.e., a predetermined threshold). Also, the controller 32 flushes the buffered write requests from the write cache 40 to the disk mirroring assembly 28 periodically (e.g., every five minutes, every two minutes, etc.).

During such data storage system operation, the controller 32 is configured to direct the disk mirroring assembly 28 to operate within a variety of power management states over time. For example, the controller 32 may initially direct the disk mirroring assembly 28 to operate in a high-power-consumption power management state due to a heavy workload provided by the external client devices 24 through the host interface 30 (e.g., see the data storage operations 22). Later, the controller 32 may direct the disk mirroring assembly 28 to operate in a low-power-consumption power management state due to a light workload subsequently provided by the external client devices 24. Accordingly, the controller 32 is capable of dynamically altering the power required to operate based on the character of the workload as particular thresholds and operating criteria are reached over time. Further details will now be provided with reference to FIG. 2.

Figure 2:
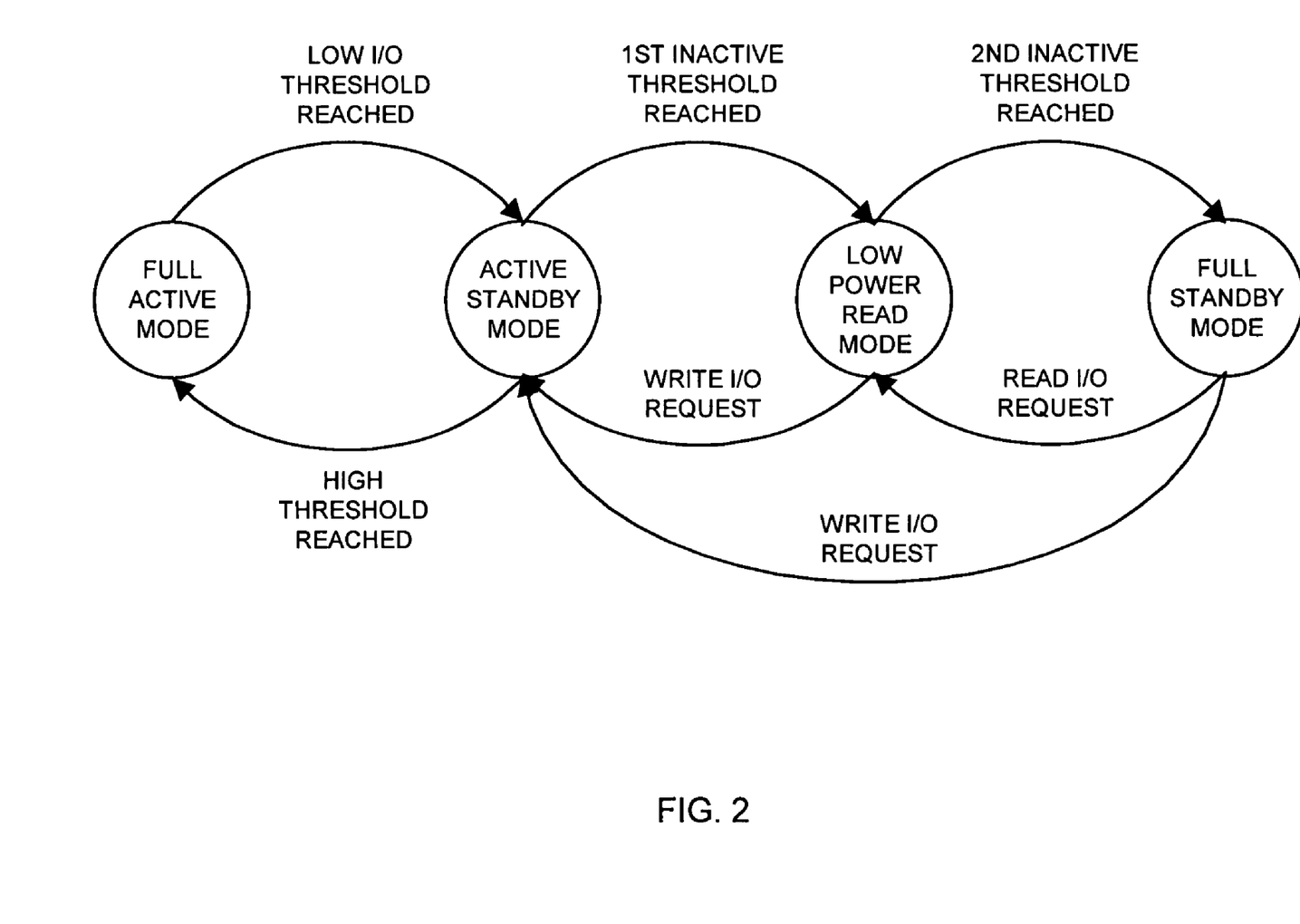
FIG. 2 is a state diagram illustrating the various power management states and transition criteria for the data storage system of FIG. 1.

FIG. 2 is a state diagram 50 illustrating the various power management states and transition criteria for the data storage system 20. As shown, the data storage system 20 is configured to operate in a "full active" mode, an "active standby" mode, a "low power read" mode, and a "full standby" mode. As shown by the connecting arrows and transition descriptions in FIG. 2, the data storage system 20 is configured to alter its current mode of operation when the data storage system 20 encounters certain changes in the workload.

In the "full active" mode, the data storage system 20 is configured to process a full workload containing both read requests and write requests. Accordingly, the controller 32 of the data storage circuitry 26 directs the platters 46(H) of each high speed disk drive 44(H) of the primary mirror 42(1) to continuously rotate at the predefined high performance speed (also see FIG. 1). Similarly, the controller 32 concurrently directs the platters 46(M) of each moderate speed disk drive 44(M) of the secondary mirror 42(2) to continuously rotate at the predefined moderate performance speed. Since the platters 46 of both mirrors 42 are continuously spinning, the data storage system 20 consumes a large amount of power but services read and write requests in the quickest manner possible. The "full active" mode of operation is well-suited to accommodate an extremely heavy workload period such as during peak business hours (e.g., during peak daily database access times, during a heavy online shopping season, etc.) when there is an extremely heavy demand to read data as well as write data.

In the "active standby" mode, the data storage system 20 is configured to process a moderate workload containing both read requests and write requests. Accordingly, the controller 32 directs the platters 46(H) of each high speed disk drive 44(H) of the primary mirror 42(1) to continuously rotate at the predefined high performance speed. Concurrently, the controller 32 directs the platters 44(M) of each moderate speed disk drive 46(M) of the secondary mirror 42(2) to spin up and spin down in response to certain data access operations (e.g., only to write requests since read requests can be attended to by the primary mirror 42(1)). Since the platters 46(H) of only the primary mirror 42(1) are continuously spinning while the platters 46(M) of the secondary mirror 42(2) spin up and down only as needed, the data storage system 20 consumes less power than during "full active" mode but nevertheless services read and write requests in the quickest manner possible in view of the drop in workload. The "active standby" mode of operation is well-suited to accommodate a heavy-to-moderate workload period such as during non-peak business hours (e.g., during off hour database access times, during a regular online shopping period, etc.) when there is a strong demand to read data as well as write data.

In the "low power read" mode, the data storage system 20 is configured to process a light workload of only read requests. Accordingly, the controller 32 directs the platters 46(H) of each high speed disk drive 44(H) of the primary mirror 42(1) to continuously rotate at the predefined high performance speed. Concurrently, the controller 32 directs the platters 46(M) of each moderate speed disk drive 44(M) of the secondary mirror 42(2) to remain spun down. Here, the platters 46(M) of the secondary mirror 42(2) remain in a deactivate, standby condition since all read requests can be fully serviced from the primary mirror 42(1) thus providing even lower power consumption than the "active standby" mode. The "active standby" mode of operation is well-suited to accommodate a period of minimal activity such as during weekend hours, or during a backup or maintenance period, etc.

In the "full standby" mode, the controller 32 directs the platters 46(H) of each high speed disk drive 44(H) of the primary mirror 42(1) to remain spun down (e.g., during long periods of inactivity). Similarly, the controller 32 directs the platters 46(H) of each moderate speed disk drive 44(M) of the secondary mirror 42(2) to remain spun down. Since the platters 46 of neither mirror 42 are spinning, the data storage system 20 there is minimal power consumed. The "full standby" mode of operation is well-suited to accommodate an extended amount of time where there is no activity on the disk mirror assembly 28 (host I/O's are still capable of being served from the caches 38, 40).

It should be understood that other modes and arrangements are capable of being configured for the data storage system 20 as well. Further details of each of the above-described modes will now be provided with reference to FIGS. 3 through 6.

Figure 3:
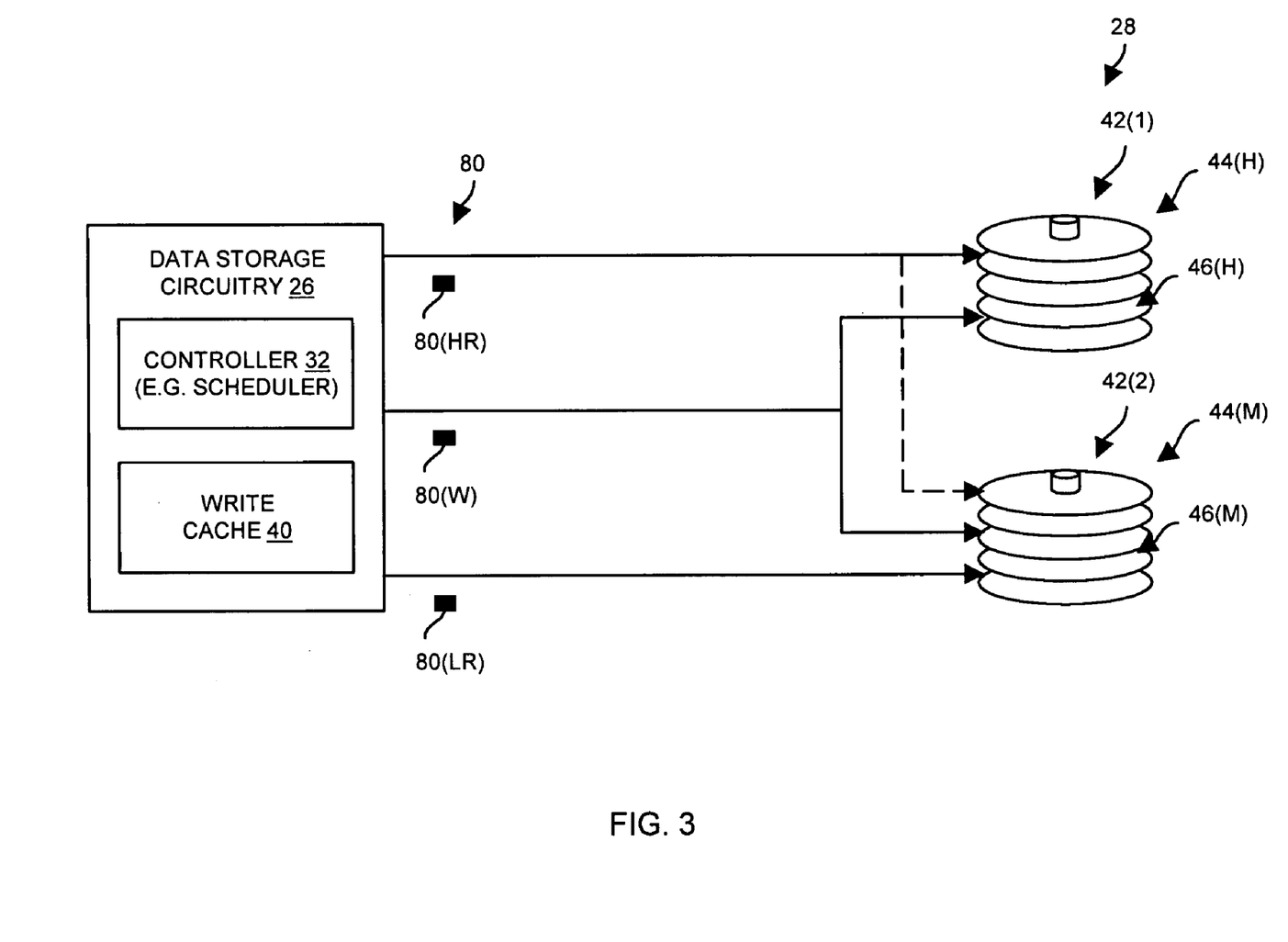
FIG. 3 is a block diagram of a "full active" mode of operation of the data storage system of FIG. 1.

FIG. 3 is a block diagram of the "full active" mode of operation of the disk mirroring assembly 28. For simplicity, only the controller 32 and the write cache 40 of the data storage circuitry 26 are shown. Furthermore, a single high speed disk drive 44(H) illustrates all of the high speed disk drives 44(H) of the primary mirror 42(1), and a single moderate speed disk drive 44(M) illustrates all of the moderate speed disk drives 44(H) of the secondary mirror 42(2). Such simplifications apply to FIGS. 4 through 6 as well.

It should be understood that the controller 32 receives I/O commands from the external client devices 24 (FIG. 1) and carries out the I/O commands by sending I/O requests 80 to the mirrors 42(1), 42(2) of the disk mirroring assembly 28. In particular, the controller 32 schedules the I/O requests 80 based on the type of request (e.g., read vs. write) and, for read requests, based on the priority of the read request (e.g., high-priority vs. low-priority). An example of a high-priority read request 80(HR) is a read cache miss. An example of a write request 80(W) is a write cache flush which may occur (i) periodically or (ii) when the controller 32 drains the write cache 40 in response to the write cache 40 reaching a certain level of capacity (e.g., 80% full). An example of a low-priority read request 80(LR) is a pre-fetch operation or a system maintenance operation.

When the disk mirroring assembly 28 operates in the "full active" mode, recall that the platters 46 of both mirrors 42 are continuously rotating, i.e., both mirrors 42 are in their "active" state. Here, the controller 32 sends high-priority read requests 80(HR) (e.g., from read cache misses) to the primary mirror 42(1). As a result, the high-priority read requests 80(HR) enjoy high performance access times. If there is an overflow of high-priority read requests 80(HR) (e.g., if the high-priority read request workload reaches or exceeds a predetermined threshold or saturation level such as 95% of full capacity), the controller 32 sends the overflow of high-priority read requests 80(HR) to the secondary mirror 42(2) as shown by the dashed line in FIG. 3. Accordingly, the data storage system 20 processes the high-priority read requests 80(HR) in the quickest manner possible.

Additionally, the controller 32 sends write requests 80(W) (e.g., write cache de-staging) to both the primary mirror 42(1) and the secondary mirror 42(2) since both mirrors 42 store copies of the data (e.g., RAID 1). It should be understood that, due to write-back caching, the data storage operations from the external client devices 24 have already been acknowledged and that the write data results from a write cache flushing operation. Accordingly, the write requests 80(W) are essentially low-priority. As a result, there is no requirement that the write requests 80(W) be carried out synchronously to the mirrors 42. Rather, such write requests 80(W) can be carried out asynchronously. Moreover, since the secondary mirror 42(2) resides in a standby condition between write cache flushes, power is conserved by the secondary mirror 42(2) while the disk drives 46(M) are spun down.

Furthermore, the controller 32 sends low-priority read requests 80(LR) to the secondary mirror 42(2). Such operation is acceptable since the slower average response time offered by the secondary mirror 42(2) is generally for pre-fetches and system maintenance reads.

When the character of the workload drops, the controller 32 is configured to transition the disk mirroring assembly 28 from the "full active" mode of operation to the "active standby" mode of operation. In particular, when the workload eventually reaches a low I/O threshold (also see FIG. 2), the controller 32 then directs the disk mirroring assembly 28 to change to a mode of lower power consumption. Further details will now be provided with reference to FIG. 4.

Figure 4:
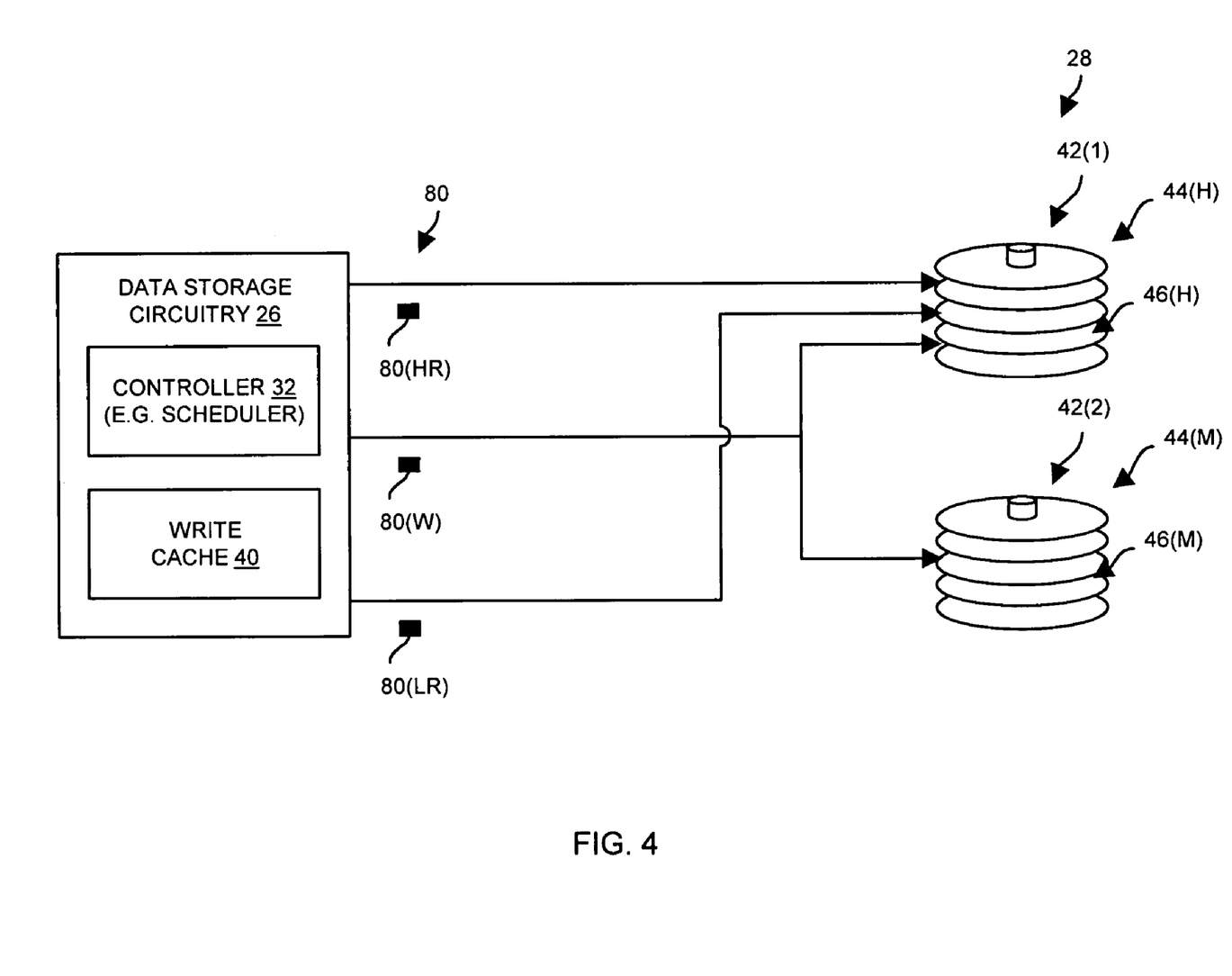
FIG. 4 is a block diagram of an "active standby" mode of operation of the data storage system of FIG. 1.

FIG. 4 is a block diagram of the "active standby" mode of operation of the disk mirroring assembly 28. When the disk mirroring assembly 28 operates in the "active standby" mode, recall that the platters 46(H) of the primary mirror 42(1) are continuously rotating (i.e., the primary mirror 42(1) is in its "active" state). However, the platters 46(M) of the secondary mirror 42(2) spin up and down only as necessary (i.e., the secondary mirror 42(2) initially resides in its "standby" state but is ready to immediately accept commands). When the disk mirroring assembly 28 is in the "active standby" mode, the controller 32 sends read requests 80(HR), 80(LR) to the primary mirror 42(1) for immediate processing. Accordingly, the data storage system 20 still processes the high-priority read requests 80(HR) in the quickest manner possible.

Additionally, the controller 32 sends write requests 80(W) to both mirrors 42. The primary mirror 42(1) is capable of processing the write requests 80(W) right away since the high speed disk drives 44(H) are actively rotating their platters 46(H). The secondary mirror 42(2) is capable of processing the write requests 80(W) following a brief spin up of the moderate speed disk drives 44(M) from "standby" states. Once the secondary mirror 42(2) completes the write operations, the moderate speed disk drives 44(M) return to their "standby" states. Since the moderate speed disk drives 44(M) preferably utilize desktop-style disk drives (e.g., high stop/start duty cycle desktop/nearline hard disk drives) such disk drives take a relatively short amount of time to spin up and withstand the wear and tear of frequent spin ups.

If the character of the workload substantially increases, the controller 32 is configured to transition the disk mirroring assembly 28 from the "active standby" mode of operation back to the "full active" mode of operation. In particular, if the workload reaches a high I/O threshold (also see FIG. 2), the controller 32 then directs the disk mirroring assembly 28 to change back to the "full active" mode.

However, if the character of the workload further decreases, the controller 32 is configured to transition the disk mirroring assembly 28 from the "active standby" mode of operation back to the "low power read" mode of operation. In particular, if the workload reaches a first inactive threshold (also see FIG. 2) such as if the controller 32 does not see any write requests 80(W) for a predefined extended amount of time (e.g., five minutes, one hour, etc.), the controller 32 then directs the disk mirroring assembly 28 to change to the "low power read" mode. Further details will now be provided with reference to FIG. 5.

Figure 5:
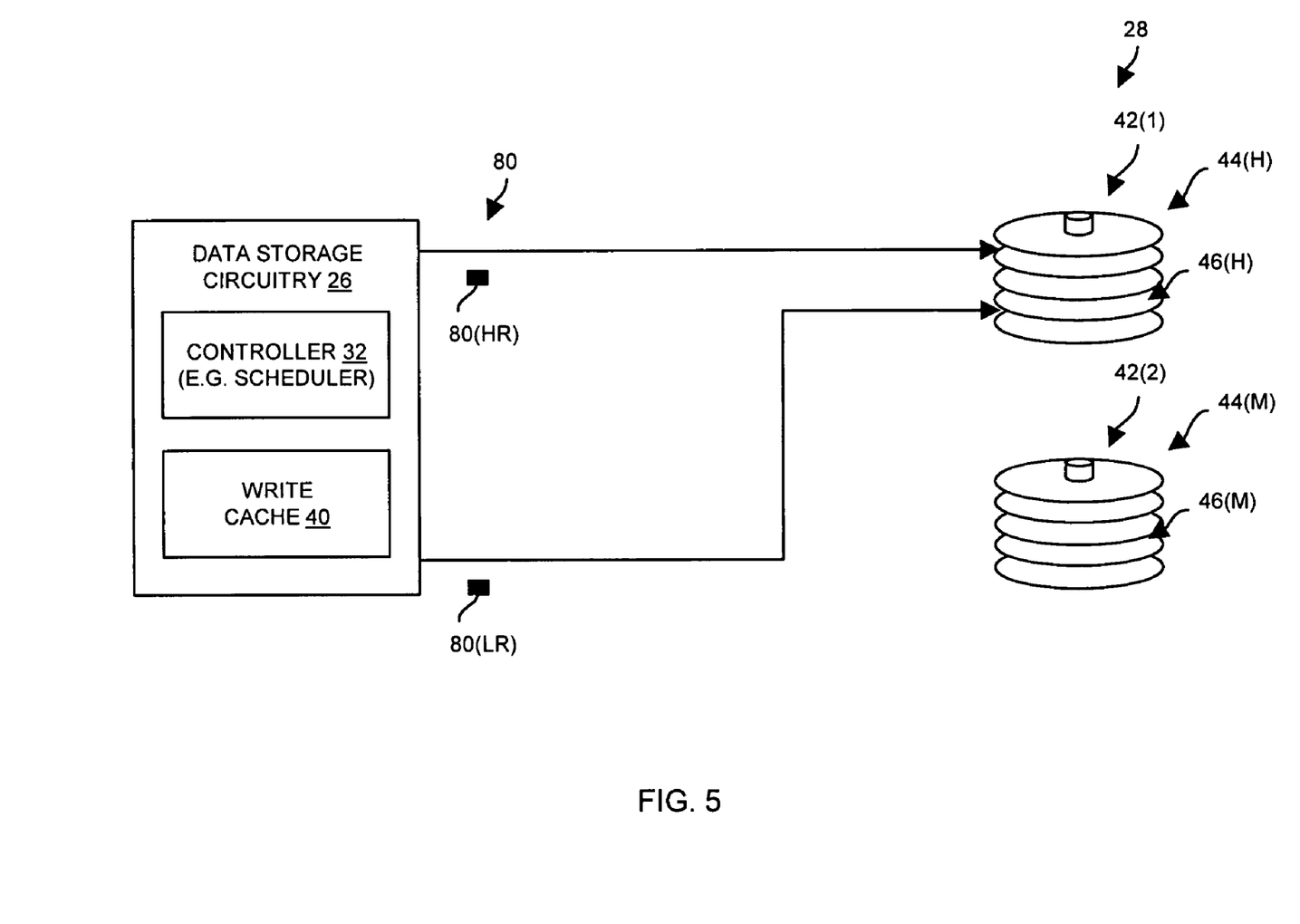
FIG. 5 is a block diagram of a "lower power read" mode of operation of the data storage system of FIG. 1.

FIG. 5 is a block diagram of the "low power read" mode of operation of the disk mirroring assembly 28. When the disk mirroring assembly 28 operates in the "low power read" mode, recall that the platters 46(H) of the primary mirror 42(1) are continuously rotating (i.e., the primary mirror 42(1) is in its "active" state), but the platters 46(M) of the secondary mirror 42(2) remain deactivated (i.e., the secondary mirror 42(2) constantly resides in its "standby" state). Thus, the controller 32 sends read requests 80(HR), 80(LR) to the primary mirror 42(1) for immediate processing. Accordingly, the data storage system 20 still processes the high-priority read requests 80(HR) in the quickest manner possible.

Furthermore, at the controller 32 there are no write requests 80(W) for processing. As a result, the secondary mirror 42(2) remains in the "standby" state thus reducing power consumption.

If the controller 32 receives a write request 80(W), the controller 32 is configured to transition the disk mirroring assembly 28 from the "low power read" mode of operation back to the "active standby" mode of operation. Once back in the "active standby" mode, the disk mirroring assembly 28 is capable of processing the write request 80(W).

However, if the workload drops to zero for a period of time, the controller 32 is configured to transition the disk mirroring assembly 28 from the "low power read" mode of operation back to the "full standby" mode of operation. In particular, if the workload reaches a second inactive threshold (also see FIG. 2) such as if the controller 32 does not see any write requests 80(W) for a predefined extended amount of time (e.g., five minutes, one hour, etc.), the controller 32 then directs the disk mirroring assembly 28 to change to the "full standby" mode. Further details will now be provided with reference to FIG. 6.

Figure 6:
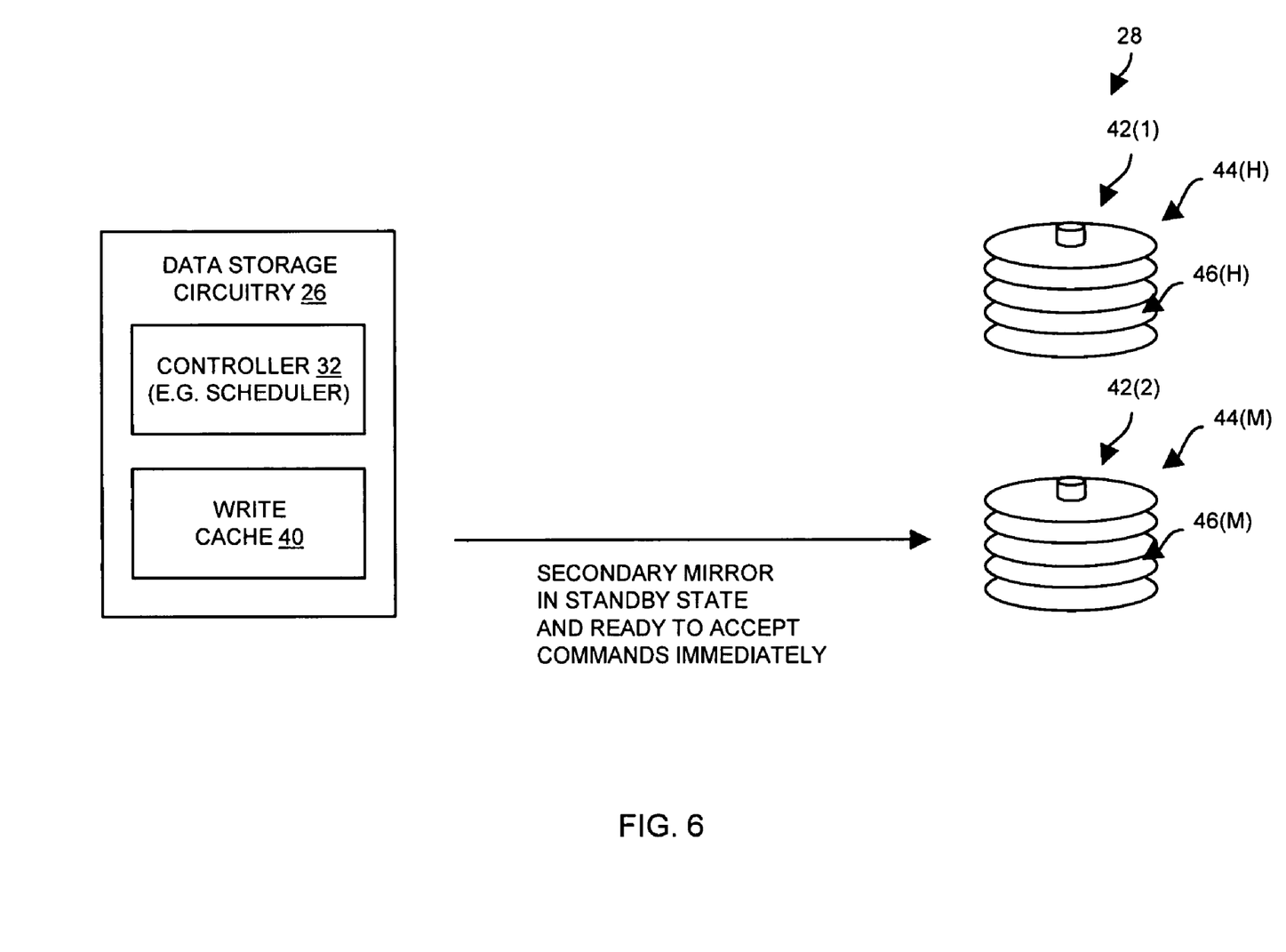
FIG. 6 is a block diagram of a "full standby" mode of operation of the data storage system of FIG. 1.

FIG. 6 is a block diagram of the "full standby" mode of operation of the disk mirroring assembly 28. When the disk mirroring assembly 28 resides in the "full standby" mode, recall that the platters 46 of both mirrors 42 remain deactivated. Nevertheless, the secondary mirror 42(2) remains ready to accept commands immediately.

For example, in response to a write request 80(W), both mirrors 42 spin up to process the write request 80(W), e.g., a transition into the "active standby" state (also see FIGS. 2 and 4). It should be understood that the secondary mirror 42(2) may spin up and process the write request 80(W) faster since the secondary mirror 42(2) has moderate speed disk drives 44(M) rather than high speed disk drives 44(H).

As another example, in response to a read request 80(W), 80(LR), the primary mirror 42(1) spins up to process the read request 80(HR), 80(LR), e.g., a transition into the "low power read" state (also see FIGS. 2 and 5). Further details will now be provided with reference to FIG. 7.

Figure 7:
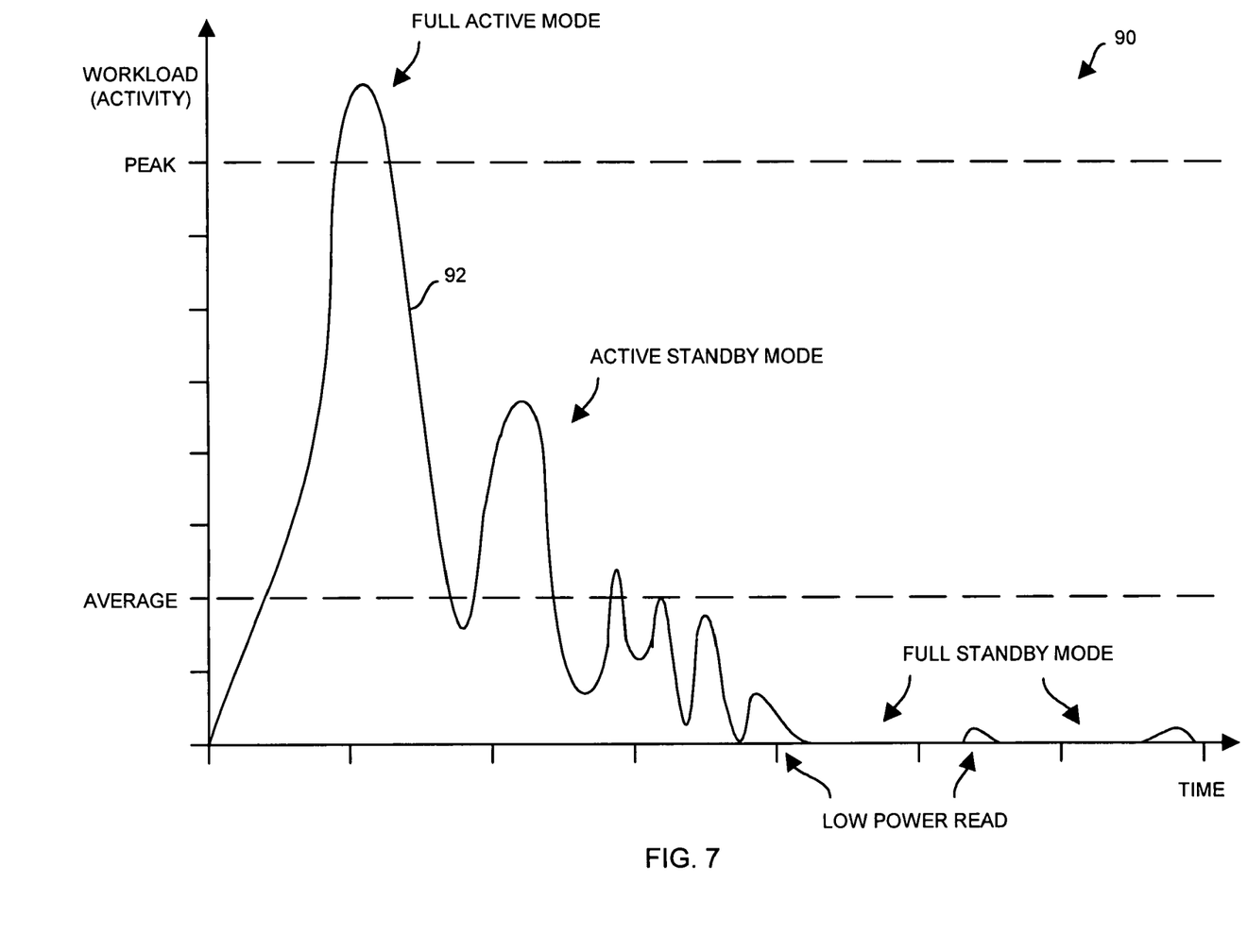
FIG. 7 is a timing diagram illustrating an example workload scenario for the data storage system of FIG. 1.

FIG. 7 is a timing diagram 90 illustrating an example workload scenario for the data storage system 20. As shown, the data storage system 20 operates in each of the various power management states over time. In particular, at times of peak activity, the controller 32 of the data storage circuitry 26 directs the disk drive assembly 28 to transition to the "full active" state in which the platters 46 of both mirrors 42 continuously rotate, e.g., see the portion of the workload curve 92 exceeding peak capacity.

At other times, the controller 32 directs the disk drive assembly 28 to transition to the "active standby" state. Here, the platters 46(H) of the primary mirror 42(1) continuously rotates. However, the platters 46(M) of the secondary mirror 42(2) spin up and down as necessary (e.g., to process write requests from write cache flushes).

At yet other times, the controller 32 directs the disk drive assembly 28 to transition to the "low power read" state. Here, the platters 46(H) of the primary mirror 42(1) continuously rotates. However, the platters 46(M) of the secondary mirror 42(2) remain spun down since there are no write requests to process.

And, at yet other times, the controller 32 directs the disk drive assembly 28 to transition to the "full standby" state. Here, the platters 46 of both mirrors 42 remain spun down. Nevertheless, the disk drive assembly 28 is capable of transitioning to another state (i.e., the "active standby" state or the "low power read" state) if there are I/O requests which require processing. Further details will now be provided with reference to FIG. 8.

Figure 8:
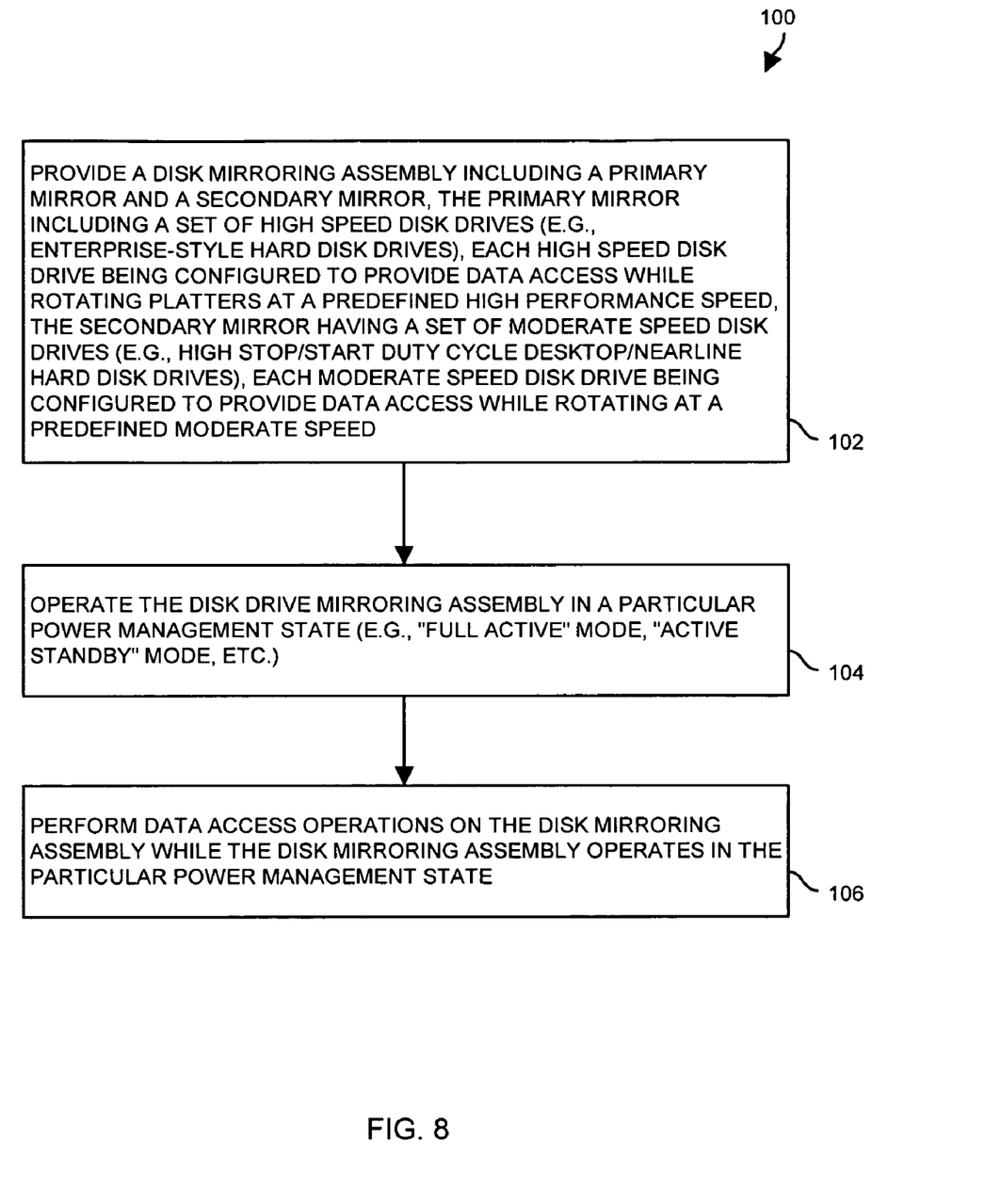
FIG. 8 is a flowchart of a procedure performed by the data storage system of FIG. 1.

FIG. 8 is a flowchart of a procedure 100 performed by the data storage system 20. In step 102, the data storage system 20 provides the disk mirroring assembly 28 having a combination of high speed disk drives 44(H) (e.g., enterprise-style disk drives) and moderate speed disk drives 44(M) (e.g., desktop-style disk drives). In particular, the platters 46(H) of the primary mirror 42(1) rotate faster than the platters 46(M) of the secondary mirror 42(2). As a result, the primary mirror 42(1) is well-suited for processing high-priority read requests 80(HR) (also see FIG. 3). Furthermore, due the fact that the moderate speed disk drives 44(M) of the secondary mirror 42(2) can quickly spin up or down and handle the associated wear and tear, the secondary mirror 42(2) can remain in a standby condition at times and thus offer power conservation without sacrificing overall data storage system response time (also see FIGS. 4 and 5). Such a configuration enables the data storage system 20 to take advantage of (i) the high performance access times offered by the high speed disk drives 46(H) of the primary mirror 42(1) and (ii) the power conservation features offered by the moderate speed disk drives 46(M) of the secondary mirror 42(2).

In step 104, the controller 32 of the data storage system 20 operates the disk mirroring assembly 28 in a particular power management state. As described earlier, the controller 32 determines the particular power management state based on the character of the current workload (also see FIG. 7).

In step 106, the controller 32 of the data storage system 20 performs data access operations on the disk mirroring assembly 28 while the disk mirroring assembly 28 operates in the particular power management state. Furthermore, over time, the controller 32 is capable of transitioning the disk mirroring assembly 28 into other power management modes as the character of the workload changes (also see FIGS. 2 and 7).

As described above, an improved technique for providing access to data involves the use of a combination of high speed disk drives 46(H) and moderate speed disk drives 46(M). The high speed disk drives 46(H) mirror data on the moderate speed disk drives 46(M), and respond to high-priority read requests 80(HR). The moderate speed disk drives 46(M) respond to low-priority read requests 80(LR). Both sets of disk drives 46(H), 46(M) respond to write requests 80(W). Relative to a conventional data storage system which uses only enterprise-style disk drives, such an improved technique offers lower power consumption since the moderate speed disk drives 46(M) consume less power. Furthermore, the moderate speed disk drives 46(M) generally take considerably less time to spin up and down than enterprise-style disk drives and thus enable the data storage system 20 to activate the moderate speed disk drives 46(M) in response to requests when the workload diminishes while still offering reasonable response times (i.e., parts of the array can be shut down with no loss of access to data and with no significant delays). As a result, the improved technique provides the data storage system 20 with the ability to dynamically alter the amount of power required to operate and thus generates significant operational cost savings over the course of its service life.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the disk mirroring assembly 28 was described above as having the platters 46(H) of the high speed disk drives 44(H) continuously rotate while the disk mirroring assembly 28 is in the "low power read" mode. In other arrangements, the platters 46(H) of the high speed disk drives 44(H) spin up and down in response to low priority read requests 80(LR) while the disk mirroring assembly 28 is in the "low power read" mode. Such operation provides additional power savings relative to continuously running the platters 46(H). In yet other arrangements in which the moderate speed disk drives 44(M) spin up to full operating speed faster than the high speed disk drives 44(H), the moderate speed disk drives 44(M) of the secondary mirror 42(2) can attend to the low-priority read requests 80(LR) rather than the high speed disk drives 44(H) of the primary mirror 42(1) while the disk mirroring assembly 28 is in the "low power read" mode in order to provide faster response times. Such modifications and enhancements are intended to belong to various embodiments.

What is claimed is:

1. In a data storage system, a method of providing access to data, the method comprising:
providing a disk mirroring assembly including a primary mirror and a secondary mirror, the primary mirror having a set of high speed disk drives, each high speed disk drive being configured to provide data access while rotating platters at a predefined high performance speed, the secondary mirror having a set of moderate speed disk drives, each moderate speed disk drive being configured to provide data access while rotating platters at a predefined moderate speed which is less than the predefined high performance speed;
operating the disk mirroring assembly in a particular power management state; and
performing data access operations on the disk mirroring assembly while the disk mirroring assembly operates in the particular power management state;
wherein the predefined high performance speed is a maximum operating speed at which each high speed disk drive is configured to read and write data;
wherein the predefined moderate performance speed is a maximum operating speed at which each moderate speed disk drive is configured to read and write data;
wherein the disk mirroring assembly is configured to operate within a variety of power management states over time including:
a "full active" mode in which (i) the platters of each high speed disk drive of the primary mirror continuously rotate at the predefined high performance speed and (ii) the platters of each moderate speed disk drive of the secondary mirror continuously rotate at the predefined moderate speed,
an "active standby" mode in which (i) the platters of each high speed disk drive of the primary mirror continuously rotate at the predefined high performance speed and (ii) the platters of each moderate speed disk drive of the secondary mirror spin up and spin down in response to certain data access operations, and
a "low power read" mode in which (i) the platters of each high speed disk drive of the primary mirror continuously rotate at the predefined high performance speed and (ii) the platters of each moderate speed disk drive of the secondary mirror remain spun down;
wherein operating the disk mirroring assembly in the particular power management state includes:
running the disk mirroring assembly in one of the "full active" mode, the "active standby" mode and the "low power read" mode at a particular point in time; and
wherein performing data access operations on the disk mirroring assembly includes:
processing high-priority read requests in the primary mirror, processing low-priority write requests in both the primary mirror and the secondary mirror, and processing low-priority read requests in the secondary mirror, while running the disk mirroring assembly in the "full active" mode.

2. A method as in claim 1 wherein performing data access operations on the disk mirroring assembly further includes:
while continuing to run the disk mirroring assembly in the "full active" mode, processing further high-priority read requests in the secondary mirror when the primary mirror becomes request saturated.

3. A method as in claim 1 wherein processing the low-priority write requests includes:
carrying out a low-priority write request in the primary mirror and in the secondary mirror in response to a write cache flushing operation which flushes the low-priority write request from a write cache of the data storage system to the disk mirror assembly.

4. A method as in claim 1 wherein the variety of power management states further includes:
a "full standby" mode in which (i) the platters of each high speed disk drive of the primary mirror remain spun down and (ii) the platters of each moderate speed disk drive of the secondary mirror remain spun down;
the disk mirroring assembly being configured to operate within each of the variety of power management states at least once over time.

5. A method as in claim 1 wherein operating the disk mirroring assembly in the particular power management state includes:

while platters of the set of high speed disk drives continuously rotate at the predefined high performance speed, receiving a high-priority read request and reading data from the platters of the set of high speed disk drives in response to the high-priority read request, and while platters of the set of moderate speed disk drives continuously rotate at the predefined moderate speed, receiving a low-priority read request and reading data from the platters of the set of moderate disk drives in response to the low-priority read request.

6. A method as in claim 1 wherein the primary mirror and the secondary mirror are configured to implement redundant array of inexpensive disks (RAID) level 1 in which data on the primary mirror is redundantly stored on the secondary mirror.

7. A method as in claim 1 wherein the disk mirroring assembly is constructed and arranged to store a first copy of host data on the primary mirror and a second copy of the host data on the secondary mirror;

wherein the high speed disk drives have spin up times which exceed spin up times of the moderate speed disk drives; and wherein the high speed disk drives have spin down times which exceed spin down times of the moderate speed disk drives.

8. In a data storage system, a method of providing access to data, the method comprising:

providing a disk mirroring assembly including a primary mirror and a secondary mirror, the primary mirror having a set of high speed disk drives, each high speed disk drive being configured to provide data access while rotating platters at a predefined high performance speed, the secondary mirror having a set of moderate speed disk drives, each moderate speed disk drive being configured to provide data access while rotating platters at a predefined moderate speed which is less than the predefined high performance speed;

operating the disk mirroring assembly in a particular power management state; and performing data access operations on the disk mirroring assembly while the disk mirroring assembly operates in the particular power management state;

wherein the predefined high performance speed is a maximum operating speed at which each high speed disk drive is configured to read and write data;

wherein the predefined moderate performance speed is a maximum operating speed at which each moderate speed disk drive is configured to read and write data;

wherein the disk mirroring assembly is configured to operate within a variety of power management states over time including:

a "full active" mode in which (i) the platters of each high speed disk drive of the primary mirror continuously rotate at the predefined high performance speed and (ii) the platters of each moderate speed disk drive of the secondary mirror continuously rotate at the predefined moderate speed, an "active standby" mode in which (i) the platters of each high speed disk drive of the primary mirror continuously rotate at the predefined high performance speed and (ii) the platters of each moderate speed disk drive of the secondary mirror spin up and spin down in response to certain data access operations, and a "low power read" mode in which (i) the platters of each high speed disk drive of the primary mirror continuously rotate at the predefined high performance speed and (ii) the platters of each moderate speed disk drive of the secondary mirror remain spun down;

wherein operating the disk mirroring assembly in the particular power management state includes:

running the disk mirroring assembly in one of the "full active" mode, the "active standby" mode and the "low power read" mode at a particular point in time; and wherein performing data access operations on the disk mirroring assembly includes:

processing high-priority read requests in only the primary mirror, processing low-priority write requests in both the primary mirror and the secondary mirror, and processing low-priority read requests in only the secondary mirror, while running the disk mirroring assembly in the "active standby" mode.

9. A method as in claim 8 wherein processing the low-priority write requests includes:

in response to a write cache flushing operation which flushes a low-priority write request from a write cache of the data storage system to the disk mirror assembly, (i) carrying out the low-priority write request in the primary mirror and (ii) spinning up each moderate speed disk drive of the secondary mirror, carrying out the low-priority write request in the secondary mirror after each moderate speed disk drive is spun up, and spinning down each moderate speed disk drive of the secondary mirror after carrying out the low-priority write request.

10. In a data storage system, a method of providing access to data, the method comprising:

providing a disk mirroring assembly including a primary mirror and a secondary mirror, the primary mirror having a set of high speed disk drives, each high speed disk drive being configured to provide data access while rotating platters at a predefined high performance speed, the secondary mirror having a set of moderate speed disk drives, each moderate speed disk drive being configured to provide data access while rotating platters at a predefined moderate speed which is less than the predefined high performance speed;

operating the disk mirroring assembly in a particular power management state; and performing data access operations on the disk mirroring assembly while the disk mirroring assembly operates in the particular power management state;

wherein the predefined high performance speed is a maximum operating speed at which each high speed disk drive is configured to read and write data;

wherein the predefined moderate performance speed is a maximum operating speed at which each moderate speed disk drive is configured to read and write data;

wherein the disk mirroring assembly is configured to operate within a variety of power management states over time including:

a "full active" mode in which (i) the platters of each high speed disk drive of the primary mirror continuously rotate at the predefined high performance speed and (ii) the platters of each moderate speed disk drive of the secondary mirror continuously rotate at the predefined moderate speed, an "active standby" mode in which (i) the platters of each high speed disk drive of the primary mirror continuously rotate at the predefined high performance speed and (ii) the platters of each moderate speed disk drive of the secondary mirror spin up and spin down in response to certain data access operations, and a "low power read" mode in which (i) the platters of each high speed disk drive of the primary mirror continuously rotate at the predefined high performance speed and (ii) the platters of each moderate speed disk drive of the secondary mirror remain spun down;
wherein operating the disk mirroring assembly in the particular power management state includes:
running the disk mirroring assembly in one of the "full active" mode, the "active standby" mode and the "low power read" mode at a particular point in time;
wherein the variety of power management states further includes:
a "full standby" mode in which (i) the platters of each high speed disk drive of the primary mirror remain spun down and (ii) the platters of each moderate speed disk drive of the secondary mirror remain spun down; and
wherein the method further comprises:
transitioning the disk mirroring assembly from the "full standby" mode to run in the "low power read" mode in response to a read request.

11. In a data storage system, a method of providing access to data, the method comprising:
providing a disk mirroring assembly including a primary mirror and a secondary mirror, the primary mirror having a set of high speed disk drives, each high speed disk drive being configured to provide data access while rotating platters at a predefined high performance speed, the secondary mirror having a set of moderate speed disk drives, each moderate speed disk drive being configured to provide data access while rotating platters at a predefined moderate speed which is less than the predefined high performance speed;
operating the disk mirroring assembly in a particular power management state; and
performing data access operations on the disk mirroring assembly while the disk mirroring assembly operates in the particular power management state;
wherein the predefined high performance speed is a maximum operating speed at which each high speed disk drive is configured to read and write data;
wherein the predefined moderate performance speed is a maximum operating speed at which each moderate speed disk drive is configured to read and write data;
wherein the disk mirroring assembly is configured to operate within a variety of power management states over time including:
a "full active" mode in which (i) the platters of each high speed disk drive of the primary mirror continuously rotate at the predefined high performance speed and (ii) the platters of each moderate speed disk drive of the secondary mirror continuously rotate at the predefined moderate speed,
an "active standby" mode in which (i) the platters of each high speed disk drive of the primary mirror continuously rotate at the predefined high performance speed and (ii) the platters of each moderate speed disk drive of the secondary mirror spin up and spin down in response to certain data access operations, and
a "low power read" mode in which (i) the platters of each high speed disk drive of the primary mirror continuously rotate at the predefined high performance speed and (ii) the platters of each moderate speed disk drive of the secondary mirror remain spun down;
wherein operating the disk mirroring assembly in the particular power management state includes:
running the disk mirroring assembly in one of the "full active" mode, the "active standby" mode and the "low power read" mode at a particular point in time;
wherein the variety of power management states further includes:
a "full standby" mode in which (i) the platters of each high speed disk drive of the primary mirror remain spun down and (ii) the platters of each moderate speed disk drive of the secondary mirror remain spun down; and
wherein the method further comprises:
transitioning the disk mirroring assembly from the "full standby" mode to run in the "active standby" mode in response to a write request.

12. A data storage system, comprising:
a host interface;
a controller coupled to the host interface; and
a disk mirroring assembly coupled to the controller, the disk mirroring assembly including (i) a primary mirror having a set of high speed disk drives, each high speed disk drive being configured to provide data access while rotating platters at a predefined high performance speed, and (ii) a secondary mirror having a set of moderate speed disk drives, each moderate speed disk drive being configured to provide data access while rotating platters at a predefined moderate speed which is less than the predefined high performance speed, the controller being configured to operate the disk mirroring assembly in a particular power management state, and perform data access operations on the disk mirroring assembly while the disk mirroring assembly operates in the particular power management state;
wherein the predefined high performance speed is a maximum operating speed at which each high speed disk drive is configured to read and write data;
wherein the predefined moderate performance speed is a maximum operating speed at which each moderate speed disk drive is configured to read and write data;
wherein the disk mirroring assembly is configured to operate within a variety of power management states over time including:
a "full active" mode in which (i) the platters of each high speed disk drive of the primary mirror continuously rotate at the predefined high performance speed and (ii) the platters of each moderate speed disk drive of the secondary mirror continuously rotate at the predefined moderate speed,
an "active standby" mode in which (i) the platters of each high speed disk drive of the primary mirror continuously rotate at the predefined high performance speed and (ii) the platters of each moderate speed disk drive of the secondary mirror spin up and spin down in response to certain data access operations, and
a "low power read" mode in which (i) the platters of each high speed disk drive of the primary mirror continuously rotate at the predefined high performance speed and (ii) the platters of each moderate speed disk drive of the secondary mirror remain spun down; and
wherein the controller, when performing data access operations on the disk mirroring assembly, is configured to:
process high-priority read requests in the primary mirror, process low-priority write requests in both the primary mirror and the secondary mirror, and process low-priority read requests in the secondary mirror, while running the disk mirroring assembly in the "full active" mode.

13. A data storage system as in claim 12 wherein the controller, when performing data access operations on the disk mirroring assembly, is further configured to:

while continuing to run the disk mirroring assembly in the "full active" mode, process further high-priority read requests in the secondary mirror when the primary mirror becomes request saturated.

14. A data storage system as in claim 12, further comprising:
a write cache; and
wherein the controller, when processing the low-priority write requests, is configured to:
carry out a low-priority write request in the primary mirror and in the secondary mirror in response to a write cache flushing operation which flushes the low-priority write request from the write cache to the disk mirror assembly.

15. A data storage system as in claim 12 wherein the variety of power management states further includes:
a "full standby" mode in which (i) the platters of each high speed disk drive of the primary mirror remain spun down and (ii) the platters of each moderate speed disk drive of the secondary mirror remain spun down;
the disk mirroring assembly being configured to operate within each of the variety of power management states at least once over time.

16. A data storage system as in claim 12 wherein the disk mirroring assembly, under direction of the controller, is constructed and arranged to store a first copy of host data on the primary mirror and a second copy of the host data on the secondary mirror;
wherein the high speed disk drives have spin up times which exceed spin up times of the moderate speed disk drives; and
wherein the high speed disk drives have spin down times which exceed spin down times of the moderate speed disk drives.

17. A data storage system as in claim 12 wherein, the controller, when operating the disk mirroring assembly in the particular power management state, is constructed and arranged to:
while platters of the set of high speed disk drives continuously rotate at the predefined high performance speed, receive a high-priority read request and read data from the platters of the set of high speed disk drives in response to the high-priority read request, and
while platters of the set of moderate speed disk drives continuously rotate at the predefined moderate speed, receive a low-priority read request and read data from the platters of the set of moderate disk drives in response to the low-priority read request.

18. A data storage system as in claim 12 wherein the primary mirror and the secondary mirror are configured to implement redundant array of inexpensive disks (RAID) level 1 in which data on the primary mirror is redundantly stored on the secondary mirror.

19. A data storage system, comprising:
a host interface;
a controller coupled to the host interface; and
a disk mirroring assembly coupled to the controller, the disk mirroring assembly including (i) a primary mirror having a set of high speed disk drives, each high speed disk drive being configured to provide data access while rotating platters at a predefined high performance speed, and (ii) a secondary mirror having a set of moderate speed disk drives, each moderate speed disk drive being configured to provide data access while rotating platters at a predefined moderate speed which is less than the predefined high performance speed, the controller being configured to operate the disk mirroring assembly in a particular power management state, and perform data access operations on the disk mirroring assembly while the disk mirroring assembly operates in the particular power management state;
wherein the predefined high performance speed is a maximum operating speed at which each high speed disk drive is configured to read and write data;
wherein the predefined moderate performance speed is a maximum operating speed at which each moderate speed disk drive is configured to read and write data;
wherein the disk mirroring assembly is configured to operate within a variety of power management states over time including:
a "full active" mode in which (i) the platters of each high speed disk drive of the primary mirror continuously rotate at the predefined high performance speed and (ii) the platters of each moderate speed disk drive of the secondary mirror continuously rotate at the predefined moderate speed,
an "active standby" mode in which (i) the platters of each high speed disk drive of the primary mirror continuously rotate at the predefined high performance speed and (ii) the platters of each moderate speed disk drive of the secondary mirror spin up and spin down in response to certain data access operations, and
a "low power read" mode in which (i) the platters of each high speed disk drive of the primary mirror continuously rotate at the predefined high performance speed and (ii) the platters of each moderate speed disk drive of the secondary mirror remain spun down; and
wherein the controller, when performing data access operations on the disk mirroring assembly, is configured to:
process high-priority read requests in only the primary mirror, process low-priority write requests in both the primary mirror and the secondary mirror, and process low-priority read requests in only the secondary mirror, while running the disk mirroring assembly in the "active standby" mode.

20. A data storage system as in claim 19 wherein the controller, when processing the low-priority write requests, is configured to:
in response to a write cache flushing operation which flushes a low-priority write request from a write cache of the data storage system to the disk mirror assembly, (i) carry out the low-priority write request in the primary mirror and (ii) spin up each moderate speed disk drive of the secondary mirror, carry out the low-priority write request in the secondary mirror after each moderate speed disk drive is spun up, and spin down each moderate speed disk drive of the secondary mirror after carrying out the low-priority write request.

21. A data storage system, comprising:
a host interface;
a controller coupled to the host interface; and
a disk mirroring assembly coupled to the controller, the disk mirroring assembly including (i) a primary mirror having a set of high speed disk drives, each high speed disk drive being configured to provide data access while rotating platters at a predefined high performance speed, and (ii) a secondary mirror having a set of moderate speed disk drives, each moderate speed disk drive being configured to provide data access while rotating platters at a predefined moderate speed which is less than the predefined high performance speed, the controller being configured to operate the disk mirroring assembly in a particular power management state, and perform data access operations on the disk mirroring assembly while the disk mirroring assembly operates in the particular power management state;

wherein the predefined high performance speed is a maximum operating speed at which each high speed disk drive is configured to read and write data;

wherein the predefined moderate performance speed is a maximum operating speed at which each moderate speed disk drive is configured to read and write data;

wherein the disk mirroring assembly is configured to operate within a variety of power management states over time including:

a "full active" mode in which (i) the platters of each high speed disk drive of the primary mirror continuously rotate at the predefined high performance speed and (ii) the platters of each moderate speed disk drive of the secondary mirror continuously rotate at the predefined moderate speed, an "active standby" mode in which (i) the platters of each high speed disk drive of the primary mirror continuously rotate at the predefined high performance speed and (ii) the platters of each moderate speed disk drive of the secondary mirror spin up and spin down in response to certain data access operations, and a "low power read" mode in which (i) the platters of each high speed disk drive of the primary mirror continuously rotate at the predefined high performance speed and (ii) the platters of each moderate speed disk drive of the secondary mirror remain spun down; and wherein the variety of power management states further includes:

a "full standby" mode in which (i) the platters of each high speed disk drive of the primary mirror remain spun down and (ii) the platters of each moderate speed disk drive of the secondary mirror remain spun down; and wherein the controller is further configured to:

transition the disk mirroring assembly from the "full standby" mode to run in the "low power read" mode in response to a read request.

22. A data storage system, comprising:

a host interface;

a controller coupled to the host interface; and a disk mirroring assembly coupled to the controller, the disk mirroring assembly including (i) a primary mirror having a set of high speed disk drives, each high speed disk drive being configured to provide data access while rotating platters at a predefined high performance speed, and (ii) a secondary mirror having a set of moderate speed disk drives, each moderate speed disk drive being configured to provide data access while rotating platters at a predefined moderate speed which is less than the predefined high performance speed, the controller being configured to operate the disk mirroring assembly in a particular power management state, and perform data access operations on the disk mirroring assembly while the disk mirroring assembly operates in the particular power management state;

wherein the predefined high performance speed is a maximum operating speed at which each high speed disk drive is configured to read and write data;

wherein the predefined moderate performance speed is a maximum operating speed at which each moderate speed disk drive is configured to read and write data;

wherein the disk mirroring assembly is configured to operate within a variety of power management states over time including:

a "full active" mode in which (i) the platters of each high speed disk drive of the primary mirror continuously rotate at the predefined high performance speed and (ii) the platters of each moderate speed disk drive of the secondary mirror continuously rotate at the predefined moderate speed, an "active standby" mode in which (i) the platters of each high speed disk drive of the primary mirror continuously rotate at the predefined high performance speed and (ii) the platters of each moderate speed disk drive of the secondary mirror spin up and spin down in response to certain data access operations, and a "low power read" mode in which (i) the platters of each high speed disk drive of the primary mirror continuously rotate at the predefined high performance speed and (ii) the platters of each moderate speed disk drive of the secondary mirror remain spun down; and wherein the variety of power management states further includes:

a "full standby" mode in which (i) the platters of each high speed disk drive of the primary mirror remain spun down and (ii) the platters of each moderate speed disk drive of the secondary mirror remain spun down; and wherein the controller is further configured to:

transition the disk mirroring assembly from the "full standby" mode to run in the "active standby" mode in response to a write request.

\* \* \* \* \*